United States Patent
Narayanan

(10) Patent No.: US 8,314,169 B2
(45) Date of Patent: Nov. 20, 2012

(54) FLAME RETARDANT POLYMER COMPOSITION

(75) Inventor: Ram Narayanan, Erlanger, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 13/054,540

(22) PCT Filed: Jul. 13, 2009

(86) PCT No.: PCT/US2009/050359
§ 371 (c)(1), (2), (4) Date: Apr. 8, 2011

(87) PCT Pub. No.: WO2010/009026
PCT Pub. Date: Jan. 21, 2010

(65) Prior Publication Data
US 2011/0178215 A1    Jul. 21, 2011

Related U.S. Application Data

(60) Provisional application No. 61/081,850, filed on Jul. 18, 2008.

(51) Int. Cl.
*C08K 5/5313* (2006.01)
*C08K 5/521* (2006.01)

(52) U.S. Cl. .......... 524/126; 524/133; 524/140

(58) Field of Classification Search ......... 524/126, 524/133, 140
See application file for complete search history.

(56) References Cited

U.S. PATENT DOCUMENTS

| | | |
|---|---|---|
| 4,623,738 A | 11/1986 | Sugerman et al. |
| 6,013,707 A | 1/2000 | Kleiner et al. |
| 6,096,914 A | 8/2000 | Seitz |
| 6,194,605 B1 | 2/2001 | Kleiner |
| 6,270,500 B1 | 8/2001 | Lerch |
| 6,365,071 B1 | 4/2002 | Jenewein et al. |
| 6,716,899 B1 | 4/2004 | Klatt et al. |
| 7,087,666 B2 | 8/2006 | Hoerold et al. |
| 7,255,814 B2 | 8/2007 | Hoerold et al. |
| 7,259,200 B2 | 8/2007 | Bauer et al. |

OTHER PUBLICATIONS

Search Report and Written Opinion for PCT/US2009/050359 dated Feb. 3, 2010, 15 pages.

*Primary Examiner* — Peter Szekely
(74) *Attorney, Agent, or Firm* — Dority & Manning, P.A.

(57) ABSTRACT

A thermoplastic polymer composition that employs a flame retardant formed from a phosphinic compound and organometallic phosphoric compound is provided. The present inventor has discovered that the organometallic phosphoric compound can counteract the tendency of the phosphinic compound to degrade the mechanical properties of the composition when used at certain concentrations. Furthermore, the present inventor has also surprisingly discovered that the organometallic phosphoric compound may itself act as a flame retardant and thus contribute to the overall flammability performance of the composition. Among other things, this allows compositions to be formed with a lower phosphinic content with the same flammability performance.

23 Claims, No Drawings

FLAME RETARDANT POLYMER COMPOSITION

CROSS REFERENCE TO RELATED APPLICATION

This application is the national stage entry of International Patent Application No. PCT/US2009/050359 having a filing date of Jul. 13, 2009, which claims the filing benefit of U.S. Provisional Application No. 61/081,850 having a filing date of Jul. 18, 2008.

BACKGROUND OF THE INVENTION

Flame retardants are used with a wide variety of polymers to improve their flammability performance. In the past, for example, halogenated (e.g., brominated) flame retardants were employed. Recent attempts have been made, however, to find substitute flame retardants that are generally free of halogens. For example, phosphinic acid salts have been employed as halogen-free flame retardants. Unfortunately, such phosphinic acid salts tend to lead to a deterioration in mechanical strength and elongation when used in the quantities needed to achieve optimum flammability performance. As such, a need remains for a flame retardant that is generally free of halogens and that is also able to achieve good mechanical properties.

SUMMARY OF THE INVENTION

In accordance with one embodiment of the present invention, a flame retardant polymer composition is disclosed that comprises at least one thermoplastic polymer and at least one flame retardant. The flame retardant comprises at least one organometallic phosphoric compound and at least one phosphinic compound that contains a phosphinate and/or a polymer formed from the phosphinate. The organometallic phosphoric compound has the formula:

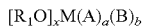

wherein, $R_1$ is a substituted or unsubstituted, straight chain, branched, or cyclic hydrocarbon group having 1 to 30 carbon atoms;

x is greater than 0;

M is zirconium or titanium;

A and B are, independently, phosphates, pyrophosphates, or a combination thereof;

a is from 1 to 5;

b is from 0 to 5; and

The phosphinate has the formula (I) and/or (II):

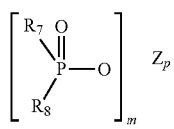

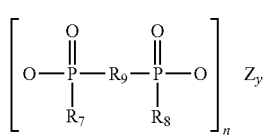

wherein, $R_7$ and $R_8$ are, independently, hydrogen or substituted or unsubstituted, straight chain, branched, or cyclic hydrocarbon group having 1 to 6 carbon atoms;

$R_9$ is a substituted or unsubstituted, straight chain, branched, or cyclic $C_1$-$C_{10}$ alkylene, arylene, arylalkylene, or alkylarylene group;

Z is magnesium, calcium, aluminum, antimony, tin, germanium, titanium, iron, zirconium, cesium, bismuth, strontium, manganese, lithium, sodium, potassium, protonated nitrogen base, or a combination thereof;

m is from 1 to 4;

n is from 1 to 4;

p is from 1 to 4; and y is from 1 to 4.

Other features and aspects of the present invention are described in more detail below.

DETAILED DESCRIPTION OF REPRESENTATIVE EMBODIMENTS

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Generally speaking, the present invention is directed to a thermoplastic polymer composition that employs a flame retardant formed from phosphinic and organometallic phosphoric compounds. The present inventor has discovered that the organometallic phosphoric compound can counteract the tendency of the phosphinic compound to degrade the mechanical properties of the composition when used at certain concentrations. Furthermore, the present inventor has also surprisingly discovered that the organometallic phosphoric compound may itself act as a flame retardant and thus contribute to the overall flammability performance of the composition. Among other things, this allows compositions to be formed with a lower phosphinic content with the same flammability performance.

I. Flame Retardant

The organometallic phosphoric compound employed in the flame retardant has the following general formula:

wherein, $R_1$ is straight chain, branched, or cyclic hydrocarbon group (e.g., alkyl, alkenyl, alkylnyl, aralkyl, aryl, alkaryl, etc.) having 1 to 30 carbon atoms, in some embodiments from 2 to 20 carbon atoms, and in some embodiments, from 3 to 15 carbon atoms, which may be substituted (e.g., oxygen substituents) or unsubstituted;

x is greater than 0, in some embodiments from 1 to 5, and in some embodiments, from 1 to 2 (e.g., 1);

M is zirconium or titanium;

A and B are, independently, phosphates (e.g., OP(O)(OR$_2$) (OR$_3$)), pyrophosphates (e.g., OP(O)(OR$_2$)OP(O)(OR$_{30}$)O), or a combination thereof, where $R_2$ and $R_3$ are, independently, hydrogen or straight chain, branched, or cyclic hydrocarbon groups (e.g., alkyl, alkenyl, alkylnyl, aralkyl, aryl, alkaryl, etc.) having 1 to 20 carbon atoms, in some embodiments from 2 to 15 carbon atoms, and in some embodiments, from 4 to 12 carbon atoms (e.g., butyl, pentyl, hexyl, heptyl, octyl, nonyl, decyl, undecyl, or dodecyl alkyl groups), which may be substituted (e.g., oxygen substituents) or unsubstituted;

a is from 1 to 5, in some embodiments from 1 to 4, and in some embodiments, from 2 to 3 (e.g., 3); and b is from 0 to 5, in some embodiments from 1 to 4, and in some embodiments, from 2 to 3.

In one embodiment, the organometallic phosphoric compound is a diester phosphate having the following formula:

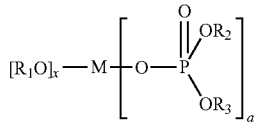

wherein, $R_1$, x, M, $R_2$, $R_3$ and a are defined above. Particularly preferred organometallic diester phosphates are neoalkoxy compounds having the following formula:

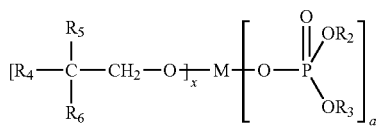

wherein, x, M, $R_2$, $R_3$, and a are defined above; and $R_4$, $R_5$, and $R_6$ are, independently, hydrogen or straight chain, branched, or cyclic hydrocarbon groups (e.g., alkyl, alkenyl, alkylnyl, aralkyl, aryl, alkaryl, etc.) having 1 to 10 carbon atoms, in some embodiments from 1 to 8 carbon atoms, and in some embodiments, from 2 to 6 carbon atoms, which may be substituted (e.g., oxygen substituents) or unsubstituted. Examples of specific $R_4$, $R_5$, and $R_5$ groups are methyl, n-propyl, iso-propyl, n-butyl, tert-butyl, sec-butyl, iso-butyl, pentyl, hexyl, heptyl, octyl, cyclohexyl, 2,4-dimethoxybenzyl, 1-methyl-4-acenaphthyl-2-ethyl-2-furyl and methallyl, methoxy, phenoxy, naphthenoxy, cyclohexene-3-oxy, 4-isobutyl-3-methoxy, 1-phenanthroxy and 2,4,6-trimethylphenoxy. Particularly suitable neoalkoxymetallic phosphates include neopentyl(diallyl)oxy, tri(dioctyl)phosphato titanate and neopentyl(diallyl)oxy, tri(dioctyl)phosphate zirconate, as well as pyrophosphate analogs thereof, such as neopentyl(diallyl)oxy, tri(dioctyl)pyrophosphato titanate and neopentyl(diallyloxy), tri(dioctyl)pyrophosphate zirconate. Such compounds are described in U.S. Pat. No. 4,623,738 to Superman, et al., which is incorporated herein in its entirety by reference thereto for all purposes. Still other suitable organometallic phosphoric compounds that may be employed in the present invention include isopropyl tri(dioctylpyrophosphate)titanate, isopropyl tri(dioctylphosphato) titanate, di(dioctylpyrophosphate)oxyacetatetitanate, di(dioctylphosphate)oxyacetatetitanate, di(dioctylpyrophosphato) ethylenetitanate, di(dioctylphosphato)ethylenetitanate, tri (butyl-octyl, pyrophosphato)ethylenetitanate, tri(butyl-octyl, phosphato)ethylenetitanate, etc.

The phosphinic compound employed in the flame retardant may include salts of phosphinic acid and/or diphosphinic acid (i.e., "phosphinates"), as well as polymers thereof. Such phosphinates may, for instance, have the formula (I) and/or formula (II):

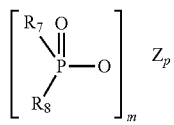

(I)

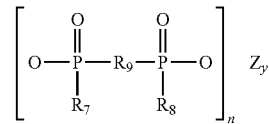

(II)

wherein, $R_7$ and $R_8$ are, independently, hydrogen or substituted or unsubstituted, straight chain, branched, or cyclic hydrocarbon groups (e.g., alkyl, alkenyl, alkylnyl, aralkyl, aryl, alkaryl, etc.) having 1 to 6 carbon atoms, particularly alkyl groups having 1 to 4 carbon atoms, such as methyl, ethyl, n-propyl, iso-propyl, n-butyl, or tert-butyl groups;

$R_9$ is a substituted or unsubstituted, straight chain, branched, or cyclic $C_1$-$C_{10}$ alkylene, arylene, arylalkylene, or alkylarylene group, such as a methylene, ethylene, n-propylene, iso-propylene, n-butylene, tert-butylene, n-pentylene, n-octylene, n-dodecylene, phenylene, naphthylene, methylphenylene, ethylphenylene, tert-butylphenylene, methylnaphthylene, ethylnaphthylene, t-butylnaphthylene, phenylethylene, phenylpropylene or phenylbutylene group;

Z is magnesium, calcium, aluminum, antimony, tin, germanium, titanium, iron, zirconium, cesium, bismuth, strontium, manganese, lithium, sodium, potassium, protonated nitrogen base, or a combination thereof, and particularly calcium or aluminum;

m is from 1 to 4, in some embodiments from 1 to 3, and in some embodiments, from 2 to 3 (e.g., 3);

n is from 1 to 4, in some embodiments from 1 to 3, and in some embodiments, from 2 to 3 (e.g., 3); and p is from 1 to 4, in some embodiments from 1 to 3, and in some embodiments, from 1 to 2.

The phosphinic compound may be prepared using any known technique, such as by reacting a phosphinic acid with metal carbonates, metal hydroxides or metal oxides in aqueous solution. Suitable phosphinic compounds include, for example, salts (e.g., aluminum or calcium salt) of dimethylphosphinic acid, ethylmethylphosphinic acid, diethylphosphinic acid, methyl-n-propylphosphinic acid, methane-di (methylphosphinic acid), ethane-1,2-di(methylphosphinic acid), hexane-1,6-di(methylphosphinic acid), benzene-1,4-di (methylphosphinic acid), methylphenylphosphinic acid, diphenylphosphinic acid, hypophosphoric acid, etc. The resulting salts are typically monomeric compounds; however, polymeric phosphinates may also be formed. Additional examples of suitable phosphinic compounds and their methods of preparation are described in U.S. Pat. No. 7,087,666 to Hoerold, et al.; U.S. Pat. No. 6,716,899 to Klatt, et al.; U.S. Pat. No. 6,270,500 to Kleiner, et al.; U.S. Pat. No. 6,194,605 to Kleiner; U.S. Pat. No. 6,096,914 to Seitz; and U.S. Pat. No. 6,013,707 to Kleiner, et al., all of which are incorporated herein in their entirety by reference thereto for all purposes.

If desired, nitrogen-containing synergists may also be employed that act in conjunction with the phosphinic compound to result in a more effective flame retardant. Such nitrogen-containing synergists are preferably those of the formulae (III) to (VIII), or a mixture of thereof:

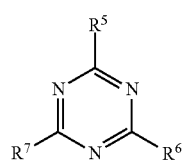

(III)

-continued

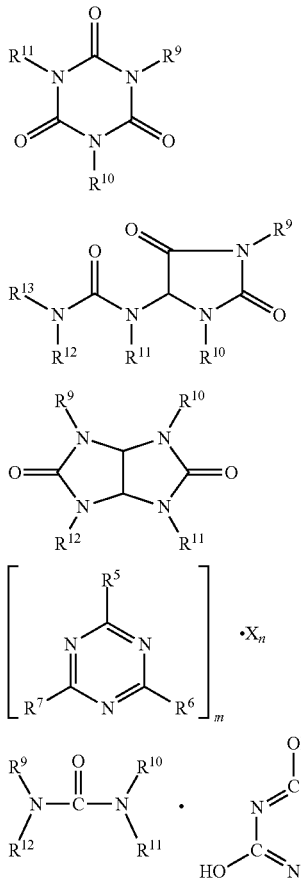

wherein,
$R_5$, $R_6$, $R_7$, $R_9$, $R_{10}$, $R_{11}$, $R_{12}$, and $R_{13}$ are, independently, hydrogen; $C_1$-$C_8$ alkyl; $C_5$-$C_{16}$-cycloalkyl or alkylcycloalkyl, optionally substituted with a hydroxy or a $C_1$-$C_4$ hydroxyalkyl; $C_2$-$C_8$ alkenyl; $C_1$-$C_8$ alkoxy, acyl, or acyloxy; $C_6$-$C_{12}$-aryl or arylalkyl; $OR^8$ or $N(R^8)R^9$, wherein $R^8$ is hydrogen, $C_1$-$C_8$ alkyl, $C_5$-$C_{16}$ cycloalkyl or alkylcycloalkyl, optionally substituted with a hydroxy or a $C_1$-$C_4$ hydroxyalkyl, $C_2$-$C_8$ alkenyl, $C_1$-$C_8$ alkoxy, acyl, or acyloxy, or $C_6$-$C_{12}$ aryl or arylalkyl;
m is from 1 to 4;
n is from 1 to 4;
X is an acid that can form adducts with triazine compounds of the formula III. For example, the nitrogen-containing synergist may include benzoguanamine, tris(hydroxyethyl)isocyanurate, allantoin, glycoluril, melamine, melamine cyanurate, dicyandiamide, guanidine, etc. Examples of such synergists are described in U.S. Pat. No. 6,365,071 to Jenewein, et al.; U.S. Pat. No. 7,255,814 to Hoerold, et al.; and U.S. Pat. No. 7,259,200 to Bauer, et al., which are incorporated herein in their entirety by reference thereto for all purposes.

The weight ratio of the phosphinic compounds to the organometallic phosphoric compounds may be selectively controlled in the present invention to achieve the desired balance between flame retardancy and mechanical properties. If the ratio is too low, for example, the flammability performance may not be sufficient. Conversely, if the ratio is too high, the mechanical properties may fall below the desired threshold. Thus, the ratio is typically within the range of from about 10 to about 200, in some embodiments from about 25 to about 150, and in some embodiments, from about 30 to about 100. However, relatively low amounts of phosphinic compounds may still be employed in comparison to conventional flame retardants and still achieve the desired mechanical and flammability performance. For example, phosphinic compounds may constitute from about 25 wt. % to about 95 wt. %, in some embodiments from about 30 wt. % to about 85 wt. %, and in some embodiments, from about 40 wt. % to about 75 wt. % of the flame retardant. Likewise, organometallic phosphoric compounds may constitute from about 0.1 wt. % to about 8 wt. %, in some embodiments from about 0.2 wt. % to about 5 wt. %, and in some embodiments, from about 0.4 wt. % to about 2 wt. % of the flame retardant. When employed, the nitrogen-containing synergists may also constitute from about 10 wt. % to about 50 wt. %, in some embodiments from about 15 wt. % to about 45 wt. %, and in some embodiments, from about 20 wt. % to about 40 wt. % of the flame retardant.

A variety of other components may also be incorporated into the flame retardant as is well known in the art. Fillers, for example, may be incorporated into the composition for various purposes. Suitable filler particles include various mineral fillers such as talc, clay, silica, calcium silicate (wollastonite), mica, calcium carbonate, titanium dioxide, and so forth. When employed, such additional components typically constitute from about 0.05 wt. % to about 15 wt. %, in some embodiments from about 0.1 wt. % to about 10 wt. %, and in some embodiments, from about 0.2 wt. % to about 5 wt. % of the flame retardant.

It should also be noted that the flammability performance and mechanical properties may be achieved in the present invention without the use of conventional halogen-based flame retardants. Consequently, the flame retardant generally possesses a halogen (e.g., bromine or chlorine) content of about 500 parts per million by weight ("ppm") or less, in some embodiments about 100 ppm or less, and in some embodiments, about 50 ppm or less.

The flame retardant may be formed in a variety of ways as would be readily apparent to one of ordinary skill in the art. The components of the flame retardant (e.g., phosphinic compound, synergist, organometallic phosphorous compound, etc.) may be mixed together prior, during, and/or after blending with the polymer. In one particular embodiment, the phosphinic compound is pre-treated with the organometallic phosphoric compound. For example, the additives may be mixed together in the presence of a non-aqueous solvent, such as glycols (e.g., propylene glycol, butylene glycol, triethylene glycol, hexylene glycol, polyethylene glycols, ethoxydiglycol, and dipropyleneglycol); alcohols (e.g., methanol, ethanol, n-propanol, and isopropanol); triglycerides; ethyl acetate; acetone; triacetin; acetonitrile, tetrahydrafuran; xylenes; formaldehydes (e.g., dimethylformamide, "DMF"); etc. Such pre-treatment of the phosphinic compound with the organometallic phosphoric compound is particularly useful when the phosphinic compound is provided in the form of particles. Namely, the organometallic phosphoric compound can be coated onto the phosphinic particle surface where it may better interact with the polymer, thereby minimizing any mechanical degradation that would otherwise have been caused by the phosphinic compound. In fact, in such embodiments, a majority (greater than 50%) of the area of the particle surface may be coated or encapsulated by the organometallic phosphoric compound. Although not required, the resultant coated particles typically have a relatively small size, such as a $D_{90}$ size of less than about 50 microns, in some embodiments from about 50 nanometers to about 40 microns, and in some embodiments, from about 0.5 microns to about 30 microns. As is well known in the art, the designation "$D_{90}$" means that at least 90% of the particles have the size indicated. It should be understood that the particles may be ground or milled to achieve the desired particle size.

Regardless of the manner in which it is formed, the flame retardant is typically employed in an amount of from about 1 wt. % to about 65 wt. %, in some embodiments from about 5 wt. % to about 60 wt. %, and in some embodiments, from about 10 wt. % to about 55 wt. %, based on the weight of the thermoplastic polymers.

II. Thermoplastic Polymer

The flame retardant of the present invention may generally be used in conjunction with any thermoplastic polymer known in the art, such as polyesters, polyamides, polyolefins, polyarylene sulfides, and so forth. Particularly suitable polyesters include those in which the carboxylic acid monomer constituents are predominantly aromatic in nature. For example, the carboxylic acid monomer constituent may be formed from aromatic dicarboxylic acids (or anhydrides thereof). Representative aromatic dicarboxylic acids that may be used include substituted and unsubstituted, linear or branched, aromatic dicarboxylic acids selected from aromatic dicarboxylic acids containing 1 to 6 carbon atoms, preferably 2 to 4 carbon atoms, as well as derivatives thereof. Non-limiting examples of aromatic dicarboxylic acids include terephthalic acid, isophthalic acid, napthalic acid, 1,4-naphthalene dicarboxylic acid, 2,7-naphthalenedicarboxylic acid, 3,4'-diphenyl ether dicarboxylic acid, 4,4'-diphenyl ether dicarboxylic acid, 3,4'-diphenyl sulfide dicarboxylic acid, 4,4'-diphenyl sulfide dicarboxylic acid, 3,4'-diphenyl sulfone dicarboxylic acid, 4,4'-diphenyl sulfone dicarboxylic acid, 3,4'-benzophenonedicarboxylic acid, etc., as well as alkyl derivatives of such acids, such as dimethyl terephthalate, dimethyl isophthalate, dimethyl-2,6-naphthalate, dimethyl-2,7-naphthalate, dimethyl-3,4'diphenyl ether dicarboxylate, dimethyl-4,4'-diphenyl ether dicarboxylate, dimethyl-3,4'-diphenyl sulfide dicarboxylate, dimethyl-4,4'-diphenyl sulfide dicarboxylate, dimethyl-3,4'-diphenyl sulfone dicarboxylate, dimethyl-4,4'-diphenyl sulfone dicarboxylate, dimethyl-3,4'-benzophenonedicarboxylate, dimethyl-4,4'-benzophenonedicarboxylate, dimethyl-1,4-naphthalate, mixtures thereof, etc., and mixtures thereof.

Suitable polyols used to form the polyester may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol, and mixtures thereof.

Specific examples of suitable polyesters may include, for instance, poly(ethylene terephthalate) ("PET"), poly(trimethylene terephthalate) ("PTT"), poly(butylene terephthalate) ("PBT"), PET modified with cyclohexanedimethanol ("CHDM"), PCTA copolymers (a polymer of CHDM and terephthalic acid with another acid substituted for a portion of the terephthalic acid, such as isophthalic acid), poly(ethylene naphthalate) ("PEN"), poly(trimethylene naphthalate) ("PTN"), poly(butylene naphthalate) ("PBN"), etc. Commercial grades of such polymers are available, for instance, from Ticona LLC under the designations CELANEX® (PBT), VANDAR® (PBT), and IMPET® (PET).

Polyamides may also be employed in the present invention. Examples of suitable polyamides may include, for instance, ring-opening polymerization-based aliphatic polyamides, such as PA6 (polycaproamide) and PA12 (polydodecanamide); polycondensation-based polyamides, such as PA66 (polyhexamethylene adipamide), PA46 (polytetramethylene adipamide), PA610, PA612, and PA11; semi-aromatic polyamides, such as MXD6, PA6T, PA9T, PA6T/66, PA6T/6, and amorphous PA; aromatic polyamides, such as poly(p-phenylene terephthalamide), poly(m-phenylene terephthalamide), and poly(m-phenylene isophthalamide); and so forth.

If desired, fibers may optionally be used to reinforce the polymer composition, such as carbon fibers, glass fibers, wollastonite fibers, etc. Glass fibers that may be used include, for instance, fibers comprised of lime-aluminum borosilicate glass. The fibers desirably have a length of from about 3 mm to about 5 mm. When employed, the reinforcement fibers may constitute from about 5 wt. % to about 50 wt. %, in some embodiments from about 10 wt. % to about 40 wt. %, and in some embodiments, from about 15 wt. % to about 35 wt. %, of the thermoplastic polymer composition.

III. Other Components

Of course, a variety of other components may generally be incorporated into the thermoplastic polymer composition as is well known in the art. Such components may include fillers, pigments, stabilizers, lubricants, drip suppressants, etc. Pigment particles may include, for instance, any suitable metal oxide, such as titanium dioxide or an iron oxide. In one embodiment, a metallic pigment may be included into the composition. Metallic pigments can include, for instance, aluminum pigments, gold pigments, copper pigments, bronze pigments, and so forth. Incorporating metallic pigment particles into the composition, for instance, may provide the article with a brushed or polished metal appearance. Pigment particles can be present in the composition in an amount from about 0.1% to about 5% by weight. Stabilizers may also be employed in the polymer composition, such as light stabilizers (e.g., hindered amines, benzotriazoles, etc.), antioxidants (e.g., sterically hindered phenols, phosphites, etc.), secondary amine stabilizers, etc. Still another ingredient that may be contained in the composition is a lubricant. The lubricant can be used in order to facilitate mold release. Examples of lubricants include soaps and esters, such as stearyl stearate, montanic esters, partially hydrolyzed montanic esters; stearic acids, polar and/or non-polar polyethylene waxes, poly-α-olefin oligomers, silicone oils, polyalkylene glycols and perfluoroalkyl ethers, polytetrafluoroethylene, and so forth. One commercially available lubricant that is well suited to being used in the composition, for instance, may include LECOLUB™ marketed by the Clariant Corporation. One example of a drip suppressant includes, for instance, a fibrillating-type fluorinated polyolefin, such as poly(tetrafluoroethylene).

The flame retardant polymer composition of the present invention may be formed into a variety of different thermoplastic articles using techniques known in the art, such as by injection molding, blow molding, calendaring, extruding, melt blowing, spinning, etc. Regardless, the resulting article is capable of achieving excellent flammability performance. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
|--------|---------------------|---------------|---------------|
| V-0    | <10                 | No            | No            |
| V-1    | <30                 | No            | No            |
| V-2    | <30                 | Yes           | No            |
| Fail   | <30                 |               | Yes           |
| Fail   | >30                 |               | No            |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-O rating, for specimens having a thickness of 0.8 millimeters.

In addition to possessing excellent flame retardancy, articles formed according to the present invention may also have excellent physical properties. For example, articles may be formed that have an unnotched Charpy impact strength (measured according to ISO 179-1982(E)) of about 25 KJ/m$^2$ or more, in some embodiments about 30 KJ/m$^2$ or more, and in some embodiments, from about 30 to about 50 KJ/m$^2$. Likewise, the elongation at break may be about 1.5% or more, in some embodiments about 1.7% or more, and in some embodiments, from about 1.8% to about 3%.

The present invention may be better understood with reference to the following examples.

EXAMPLE 1

The ability to form a flame retardant polymer composition in accordance with the present invention was demonstrated. In this Example, unreinforced CELANEX® 2002 (polybutylene terephthalate, commercially available from Ticona, LLC) was blended with either KEN-REACT® CAPOW® KR12H or KEN-REACT® CAPOW® L12H, both of which are organometallic phosphoric compounds available from Kenrich Petrochemicals, Inc. More specifically, CAPOW® KR12H contains 65 wt. % of a mono-alkoxy phosphato titanate (isopropyl, tri(dioctyl)phosphate titanate) dispersed on 35 wt. % silica, and CAPOW® L12H contains 65 wt. % of a neo-alkoxy phosphato titanate (pentyl(diallyl)oxy, tri(dioctyl)phosphate titanate) dispersed on 35 wt. % silica. The phosphinate was obtained from Clariant under the designation EXOLIT™ OP 1240 and was combined with MELAPUR™ MC 50, a melamine cyanurate synergist obtained from Ciba Specialty Chemicals. The phosphinate or the phosphinate/synergist combination and organotitanate phosphoric compound were dry blended together to form a mixture at room temperature for 5 minutes. Thereafter, the mixture was melt blended with the CELANEX® 2002 and minor amounts of processing additives (lubricant, antioxidant and stabilizer) within a co-rotating twin screw extruder. The processing additives and the PBT polymer were fed upstream in the extruder and the flame retardant-organotitanate phosphoric compound mix was fed downstream in the extruder. The extruder temperature settings (upstream to downstream) were 125° C., 260° C., 260° C., 250° C., 250° C., 220° C., 240° C., and 260° C., and the screw rotation rate was 300 rpm.

The content of each sample is set forth below in more detail in Table 1.

TABLE 1

Content of Polymer Composition

| Sample | Coupling Additive (Type) | Coupling Additive (wt. %) | EXOLIT™ OP 1240 (wt. %) | PBT (wt. %) | Processing Additives (wt. %) |
|---|---|---|---|---|---|
| Control 1 | — | 0.00% | 13.30% | 85.7% | 1.00% |
| Control 2 | — | 0.00% | 13.30% | 85.7% | 1.00% |
| Control 3 | — | 0.00% | 13.30% | 85.7% | 1.00% |
| 1 | Neo-alkoxy Phosphato Titanate on Silica | 0.30% | 13.30% | 85.4% | 1.00% |
| 2 | Neo-alkoxy Phosphato Titanate on Silica | 0.30% | 13.30% | 85.4% | 1.00% |
| 3 | Mono-alkoxy Phosphato Titanate on Silica | 0.30% | 13.30% | 85.4% | 1.00% |
| 4 | Neo-alkoxy Phosphato Titanate on Silica | 1.00% | 13.30% | 84.7% | 1.00% |

Once formed, the flammability performance, melt properties, and mechanical characteristics were then determined. The results are set forth below in Table 2.

TABLE 2

Properties of Samples

| Sample | UL rating at 0.8 mm | UL Critical Flame time (secs)* | Melt Flow Rate (250° C., 2.16 kg) (g/10 min) | Elongation at Break (%) | Unnotched Charpy Impact Strength (KJ/m$^2$) |
|---|---|---|---|---|---|
| Control 1 | V-0 | 26 | 9.7 | 13.7 | 32.1 |
| Control 2 | V-0 | 49 | 15.5 | 4.4 | 25.3 |
| Control 3 | V-0 | 34 | 10.6 | 13.3 | 32.0 |
| 1 | V-0 | 21 | 10.2 | 16.7 | 37.1 |
| 2 | V-0 | 23 | 10.3 | 14.2 | 31.53 |

TABLE 2-continued

Properties of Samples

| Sample | UL rating at 0.8 mm | UL Critical Flame time (secs)* | Melt Flow Rate (250° C., 2.16 kg) (g/10 min) | Elongation at Break (%) | Unnotched Charpy Impact Strength (KJ/m$^2$) |
|---|---|---|---|---|---|
| 3 | V-0 | 34 | 9.8 | 13.7 | 43.9 |
| 4 | V-1 | 52 | 12.5 | 12.8 | 29.9 |

*The "UL Critical Flame Time" is the sum of t1 (the duration of flaming after withdrawing the specimen from the first flame) and t2 (the duration of flaming after the specimen is placed back under the flame for a second time and then withdrawn) and the number shown is the sum for 5 specimens.

As indicated, the use of a flame retardant containing an organometallic phosphorous compound and phosphinate generally resulted in samples with good flammability performance and improved mechanical properties.

EXAMPLE 2

The ability to form a flame retardant polymer composition in accordance with the present invention was demonstrated. In this Example, the flame retardant was formed from KEN-REACT® CAPOW® KR12H, EXOLIT™ OP 1240, and MELAPUR™ MC 50 in the manner described in Example 1. Thereafter, the mixture was melt blended with the CELANEX® 2003, glass fibers, and minor amounts of processing additives (lubricant, antioxidant and stabilizer) within a co-rotating twin screw extruder. The processing additives and the PBT polymer were fed upstream in the extruder. The flame retardant-organotitanate phosphoric compound mix and the glass fibers were fed downstream in the extruder. The extruder temperature settings (upstream to downstream) were 125° C., 260° C., 260° C., 250° C., 250° C., 220° C., 240° C., and 260° C., and the screw rotation rate was 300 rpm. The content of the sample is set forth below in more detail in Table 3.

As indicated, the use of a flame retardant containing an organometallic phosphorous compound and phosphinate resulted in a sample with good flammability performance and improved mechanical properties.

EXAMPLE 3

The ability to form a flame retardant polymer composition in accordance with the present invention was demonstrated. In this Example, the flame retardant was formed from various EXOLIT™ OP 1240, MELAPUR™ MC 50, and various alkoxy titanates or alkoxy zirconate coupling additives in the manner described in Example 1. The coupling additives employed in this Example are set forth below.

| Coupling Additive Type | Example |
|---|---|
| Neo-alkoxy Phosphato Titanate on Silica | Ken-React ® LICA ® 12H |
| Mono-alkoxy Phosphato Titanate on Silica | Ken-React ® KR ® 12H |
| Neo-alkoxy Phosphato Titanate | Ken-React ® LICA ® 12 |
| Mono-alkoxy Phosphato Titanate | Ken-React ® KR ® 12 |
| Neo-alkoxy Pyrophosphato Titanate | Ken-React ® LICA ® 38 |
| Neo-alkoxy Phosphato Zirconate | Ken-React ® NZ ® 12 |
| Neo-alkoxy Pyrophosphato Zirconate | Ken-React ® NZ ® 38 |
| Neo-alkoxy tri(N-ethylenediamino) ethyl zirconate | Ken-React ® NZ ® 44 |

Once formed, the mixture was melt blended with the CELANEX® 2003, glass fibers, and minor amounts of processing additives (lubricant, antioxidant and stabilizer)

TABLE 3

Content of Polymer Composition

| Sample | Coupling Additive Type | Coupling additive (Wt. %) | EXOLIT™ OP 1240 (wt. %) | MELAPUR™ MC50 (wt. %) | PBT (wt. %) | Glass Fiber (wt. %) | Processing Additives (wt. %) |
|---|---|---|---|---|---|---|---|
| Control 4 | — | 0.00% | 15.00% | 7.50% | 56.5% | 20.00% | 1.00% |
| 5 | Mono-alkoxy Phosphato Titanate on Silica | 0.30% | 13.33% | 6.67% | 63.0% | 16.00% | 1.00% |

Once formed, the flammability performance, melt properties, and mechanical characteristics were then determined. The results are set forth below in Table 4.

within a co-rotating twin screw extruder. The processing additives and the PBT polymer were fed upstream in the extruder. The flame retardant-organotitanate phosphoric

TABLE 4

Properties of Samples

| Sample | UL rating at 0.8 mm | UL Critical Flame time (secs) | Melt Flow Rate (250° C., 2.16 kg) (g/10 min) | Elongation at Break (%) | Unnotched Charpy Impact Strength (KJ/m$^2$) |
|---|---|---|---|---|---|
| Control 4 | V-0 | 35 | 5.0 | 2.3 | 36.0 |
| 5 | V-0 | 33 | 3.2 | 2.7 | 37.7 | compound mix and the glass fibers were fed downstream in the extruder. The extruder temperature settings (upstream to downstream) were 125° C., 260° C., 260° C., 250° C., 250° C., 220° C., 240° C., and 260° C., and the screw rotation rate was 300 rpm. The content of each sample is set forth below in more detail in Table 5.

TABLE 5

Content of Polymer Composition

| Sample | Coupling Additive Type | Coupling additive (Wt. %) | EXOLIT ™ OP 1240 (Wt. %) | MELAPUR ™ MC50 (Wt. %) | PBT (Wt. %) | Glass Fiber (Wt. %) | Processing Additives (Wt. %) |
|---|---|---|---|---|---|---|---|
| Control 5 | — | 0.00% | 15.0% | 7.5% | 46.5% | 30.0% | 1.00% |
| 6 | Neo-alkoxy Phosphato Titanate on Silica | 0.30% | 15.0% | 7.5% | 46.2% | 30.0% | 1.00% |
| 7 | Neo-alkoxy Phosphato Titanate on Silica | 0.30% | 15.0% | 7.5% | 46.2% | 30.0% | 1.00% |
| 8 | Neo-alkoxy Phosphato Titanate on Silica | 0.30% | 13.3% | 6.7% | 48.7% | 30.0% | 1.00% |
| 9 | Neo-alkoxy Phosphato Titanate on Silica | 0.30% | 15.0% | 7.5% | 50.2% | 26.0% | 1.00% |
| 10 | Mono-alkoxy Phosphato Titanate on Silica | 0.30% | 13.3% | 6.7% | 52.7% | 26.0% | 1.00% |
| 11 | Mono-alkoxy Phosphato Titanate on Silica | 0.30% | 13.3% | 6.7% | 52.7% | 26.0% | 1.00% |
| 12 | Mono-alkoxy Phosphato Titanate on Silica | 0.30% | 13.3% | 6.7% | 52.7% | 26.0% | 1.00% |
| 13 | Mono-alkoxy Phosphato Titanate | 0.30% | 13.3% | 6.7% | 52.7% | 26.0% | 1.00% |
| 14 | Neo-alkoxy Phosphato Titanate | 0.30% | 13.3% | 6.7% | 52.7% | 26.0% | 1.00% |
| 15 | Neo-alkoxy Pyrophosphato Titanate | 0.30% | 13.3% | 6.7% | 52.7% | 26.0% | 1.00% |
| 16 | Neo-alkoxy Phosphato Zirconate | 0.30% | 13.3% | 6.7% | 52.7% | 26.0% | 1.00% |
| 17 | Neo-alkoxy Pyrophosphato Zirconate | 0.30% | 13.3% | 6.7% | 52.7% | 26.0% | 1.00% |
| 18 | Neo-alkoxy Tri(N-Ethylenediamino) ethyl Zirconate | 0.30% | 13.3% | 6.7% | 52.7% | 26.0% | 1.00% |

Once formed, the flammability performance, melt properties, and mechanical characteristics were then determined. The results are set forth below in Table 6.

TABLE 6

Properties of Samples

| Sample | UL rating at 0.8 mm | UL Critical Flame time (secs) | Melt Flow Rate (250° C., 2.16 kg) (g/10 min) | Elongation at Break (%) | Unnotched Charpy Impact Strength (KJ/m$^2$) |
|---|---|---|---|---|---|
| Control 5 | V-0 | 50 | 7.9 | 1.5 | 23.5 |
| 6 | V-0 | 24 | 6.2 | 1.6 | 26.4 |
| 7 | V-0 | 30 | 6.3 | 1.8 | 27.8 |

TABLE 6-continued

Properties of Samples

| Sample | UL rating at 0.8 mm | UL Critical Flame time (secs) | Melt Flow Rate (250° C., 2.16 kg) (g/10 min) | Elongation at Break (%) | Unnotched Charpy Impact Strength (KJ/m$^2$) |
|---|---|---|---|---|---|
| 8 | V-0 | 43 | 13.2 | 2.1 | 35.2 |
| 9 | V-0 | 39 | 7.5 | 1.6 | 31.8 |
| 10 | V-0 | 27 | 10.3 | 1.9 | 36.2 |
| 11 | V-0 | 31 | 9.6 | 1.9 | 40.0 |
| 12 | V-0 | 36 | 25.2* | 2.2 | 30.0 |
| 13 | V-0 | 50 | 24.8* | 2.2 | 31.2 |
| 14 | V-0 | 39 | 25.0* | 2.0 | 30.3 |
| 15 | V-0 | 48 | 25.4* | 1.9 | 31.2 |
| 16 | V-0 | 44 | 25.1* | 2.0 | 29.5 |
| 17 | V-0 | 26 | 25.0* | 2.2 | 31.7 |
| 18 | V-0 | 35 | 16.5* | 1.4 | 16.3 |

As indicated, the use of a flame retardant containing an organometallic phosphorous compound and phosphinate generally resulted in samples with good flammability performance and improved mechanical properties.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A flame retardant polymer composition, the composition comprising:
at least one thermoplastic polymer; and
at least one flame retardant, the flame retardant comprising
at least one organometallic phosphoric compound having the formula:

[R$_1$O]$_x$M(A)$_a$(B)$_b$ wherein,
R$_1$ is a substituted or unsubstituted, straight chain, branched, or cyclic hydrocarbon group having 1 to 30 carbon atoms;
x is greater than 0;
M is zirconium or titanium;
A and B are, independently, phosphates, pyrophosphates, or a combination thereof;
a is from 1 to 5;
b is from 0 to 5; and
at least one phosphinic compound that contains a phosphinate having the formula (I) and/or (II), and/or a polymer formed from the phosphinate:

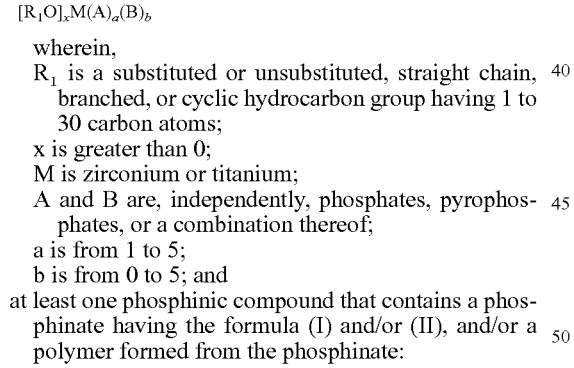

wherein,
R$_7$ and R$_8$ are, independently, hydrogen or substituted or unsubstituted, straight chain, branched, or cyclic hydrocarbon group having 1 to 6 carbon atoms;

R$_9$ is a substituted or unsubstituted, straight chain, branched, or cyclic C$_1$-C$_{10}$ alkylene, arylene, arylalkylene, or alkylarylene group;
Z is magnesium, calcium, aluminum, antimony, tin, germanium, titanium, iron, zirconium, cesium, bismuth, strontium, manganese, lithium, sodium, potassium, protonated nitrogen base, or a combination thereof;
m is from 1 to 4;
n is from 1 to 4;
p is from 1 to 4; and
y is from 1 to 4
and wherein the weight ratio of the phosphinic compound to the organometallic phosphoric compound is from about 10 to about 200.

2. The flame retardant polymer composition of claim 1, wherein x is from 1 to 2.

3. The flame retardant polymer composition of claim 1, wherein M is titanium.

4. The flame retardant polymer composition of claim 1, wherein the organometallic phosphoric compound is a diester phosphate having the following formula:

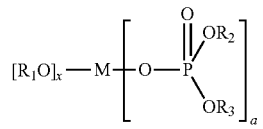

wherein,
R$_2$ and R$_3$ are, independently, hydrogen or substituted or unsubstituted, straight chain, branched, or cyclic hydrocarbon groups having 1 to 20 carbon atoms.

5. The flame retardant polymer composition of claim 4, wherein a is 3.

6. The flame retardant polymer composition of claim 4, wherein R$_2$ and R$_3$ are, independently, substituted or unsubstituted, straight chain, branched, or cyclic alkyl groups having 4 to 12 carbon atoms.

7. The flame retardant polymer composition of claim 4, wherein the organometallic diester phosphate is a neoalkoxy compound having the following formula:

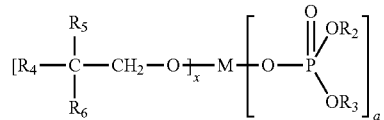

wherein,
R$_4$, R$_5$, and R$_6$ are, independently, hydrogen or substituted or unsubstituted, straight chain, branched, or cyclic hydrocarbon groups having 1 to 10 carbon atoms.

8. The flame retardant polymer composition of claim 1, wherein the organometallic phosphoric compound is neopentyl(diallyl)oxy, tri(dioctyl)phosphato titanate; neopentyl(diallyl)oxy, tri(dioctyl)phosphato zirconate; neopentyl(diallyl)oxy, tri(dioctyl)pyrophosphato titanate; neopentyl(diallyloxy), tri(dioctyl)pyrophosphate zirconate; isopropyl tri(dioctylpyrophosphate)titanate; isopropyl tri(dioctylphosphato)titanate; di(dioctylpyrophosphate)oxyacetatetitanate; di(dioctylphosphate)oxyacetatetitanate; di(dioctylpyrophosphato)ethylenetitanate; di(dioctylphosphato)ethylenetitanate; tri(butyl-octyl, pyrophosphato)ethylenetitanate; tri(butyi-octyl, phosphato)ethylenetitanate; or a combination thereof.

9. The flame retardant polymer composition of claim 1, wherein $R_7$ and $R_8$ are ethyl groups.

10. The flame retardant polymer composition of claim 1, wherein Z is aluminum.

11. The flame retardant polymer composition of claim 1, wherein m and n are 3.

12. The flame retardant polymer composition of claim 1, further comprising a nitrogen-containing synergist.

13. The flame retardant polymer composition of claim 1, wherein the phosphinic compound constitutes from about 25 wt.% to about 95 wt % of the flame retardant and the organometallic phosphoric compound constitutes from about 0.1 wt.% to about 8 wt.% of the flame retardant.

14. The flame retardant polymer composition of claim 1, wherein the flame retardant has a halogen content of about 100 ppm or less.

15. The flame retardant polymer composition of claim 1, wherein the phosphinic compound is in the form of a particle, and the organometallic compound is present on a surface of the particle.

16. The flame retardant polymer composition of claim 1, wherein the thermoplastic polymer is an aromatic polyamide, semi-aromatic polyamide, or a combination thereof.

17. The flame retardant polymer composition of claim 1, wherein the thermoplastic polymer is poly(ethylene terephthalate) or a copolymer thereof, poly(trimethylene terephthalate) or a copolymer thereof, poly(butylene terephthalate) or a copolymer thereof, or a combination thereof.

18. The flame retardant polymer composition of claim 1, further comprising glass fibers.

19. The flame retardant polymer composition of claim 1, wherein the flame retardant is present in an amount of from about 10 wt.% to about 55 wt.%, based on the weight of the thermoplastic polymer.

20. A molded article formed from the flame retardant polymer composition of claim 1, wherein the article has a V-0 rating for a specimen thickness of 0.8 millimeters, as determined according to the UL 94 Vertical Burn Test.

21. The molded article of claim 20, wherein the article has an unnotched Charpy impact strength (measured according to ISO 179-1982(E)) of about 25 KJ/m² or more and an elongation at break may be about 1.5% or more.

22. A flame retardant polymer composition, the composition comprising:
at least one thermoplastic polymer; and
at least one flame retardant, the flame retardant comprising
at least one organometallic phosphoric compound having the formula:

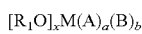

wherein,
$R_1$ is a substituted or unsubstituted, straight chain, branched, or cyclic hydrocarbon group having 1 to 30 carbon atoms;
x is greater than 0;
M is zirconium or titanium;
A and B are, independently, phosphates, pyrophosphates, or a combination thereof;
a is from 1 to 5;
b is from 0 to 5; and
at least one phosphinic compound that contains a phosphinate having the formula (I) and/or (II), and/or a polymer formed from the phosphinate:

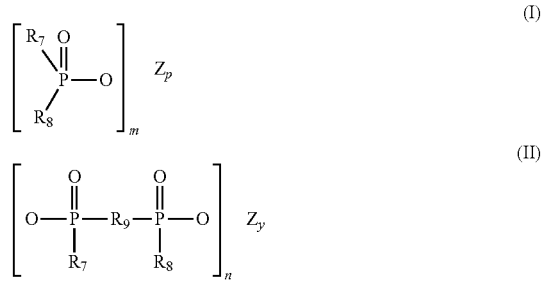

wherein,
$R_7$ and $R_8$ are, independently, hydrogen or substituted or unsubstituted, straight chain, branched, or cyclic hydrocarbon group having 1 to 6 carbon atoms;
$R_9$ is a substituted or unsubstituted, straight chain, branched, or cyclic $C_1$-$C_{10}$ alkylene, arylene, arylalkylene, or alkylarylene group;
Z is magnesium, calcium, aluminum, antimony, tin, germanium, titanium, iron, zirconium, cesium, bismuth, strontium, manganese, lithium, sodium, potassium, protonated nitrogen base, or a combination thereof;
m is from 1 to 4;
n is from 1 to 4;
p is from 1 to 4; and
y is from 1 to 4
and wherein the phosphinic compound constitutes from about 25 wt.% to about 95 wt.% of the flame retardant and the organometallic phosphoric compound constitutes from about 0.1 wt.% to about 8 wt.% of the flame retardant.

23. A flame retardant polymer composition, the composition comprising:
at least one thermoplastic polymer; and
at least one flame retardant, the flame retardant comprising
at least one organometallic phosphoric compound having the formula:

wherein,
$R_1$ is a substituted or unsubstituted, straight chain, branched, or cyclic hydrocarbon group having 1 to 30 carbon atoms;
x is greater than 0;
M is zirconium or titanium;
A and B are, independently, phosphates, pyrophosphates, or a combination thereof;
a is from 1 to 5;
b is from 0 to 5; and at least one phosphinic compound that contains a phosphinate having the formula (I) and/or (II), and/or a polymer formed from the phosphinate:

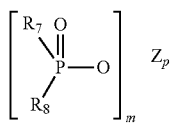  (I)

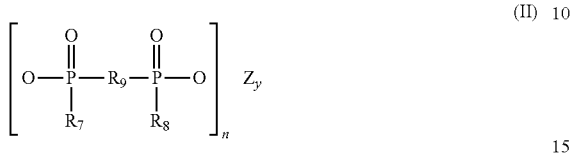  (II)

wherein,

R$_7$ and R$_8$ are, independently, hydrogen or substituted or unsubstituted, straight chain, branched, or cyclic hydrocarbon group having 1 to 6 carbon atoms;

R$_9$ is a substituted or unsubstituted, straight chain, branched, or cyclic C$_1$-C$_{10}$ alkylene, arylene, arylalkylene, or alkylarylene group;

Z is magnesium, calcium, aluminum, antimony, tin, germanium, titanium, iron, zirconium, cesium, bismuth, strontium, manganese, lithium, sodium, potassium, protonated nitrogen base, or a combination thereof;

m is from 1 to 4;

n is from 1 to 4;

p is from 1 to 4; and y is from 1 to 4 and wherein the phosphinic compound is in the form of a particle, and the organometallic compound is present on a surface of the particle.

* * * * *